United States Patent Office 3,525,690
Patented Aug. 25, 1970

3,525,690
GREASE COMPOSITIONS
John B. Christian, Yellow Springs, Ohio, assignor to the United States of America as represented by the Secretary of the Air Force
No Drawing. Continuation-in-part of application Ser. No. 433,227, Feb. 16, 1965. This application Aug. 30, 1967, Ser. No. 665,205
Int. Cl. C10m 7/28, 7/30
U.S. Cl. 252—25   5 Claims

ABSTRACT OF THE DISCLOSURE

A grease composition stable up to 600° F. comprising (a) a thickener selected from the group consisting of 19 to 24% by weight of ammeline, 7 to 10% by weight of spherical boron nitride particles ranging from .1 to .5 micron in diameter and 20 to 35% in weight of a fluorocarbon resin or polymer, and (b) the balance a base fluid of hexafluoropropylene epoxide.

CROSS-REFERENCE TO RELATED APPLICATION

This application is a continuation-in-part of application Ser. No. 433,227 now abandoned filed Feb. 16, 1965.

BACKGROUND OF THE INVENTION

Field of the invention

The present invention relates to a grease composition, which has been found to be heat stable at temperatures up to 600° F., comprising (a) a base fluid of hexafluoropropylene epoxide and (b) selected thickeners in certain fixed proportions.

Description of the prior art

Broadly the prior art teaches that each of the components of the present grease composition or closely related compounds have been used in lubricating formulations. Thus, U.S. Pat. No. 3,250,808 to Moore, Jr. et al. teaches that ethers of hexafluoropropylene epoxide,

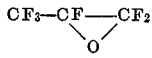

(Col. 1, lines 27–34) are useful as lubricants which are stable at high temperatures (col. 9, lines 51–54). In addition U.S. Pat. No. 3,196,109 to Morway et al. discloses boron nitride as a grease thickener while the publication "Advances in Petroleum Chemistry and Refining" by Kobe et al. vol. 9, Interscience Pub., New York, 1964, at page 105 mentions the use of triazine and Teflon as lube thickeners. However, the present composition distinguishes patentably over the above prior art in the superior and unobvious results obtained which stem from the particular proportions of base fluid and thickener employed. In the case of boron nitride it is essential in the present invention that the particles thereof be in the form of spheres and not platelets.

SUMMARY OF THE INVENTION

The present invention is directed to a grease formulation which broadly comprises (a) a thickener selected from the group consisting of 19 to 24% by weight of ammeline, 7 to 10% by weight of spherical boron nitride particles ranging from .1 to .5 micron in diameter and 20 to 35% in weight of a fluorinated ethylene-propylene polymer, and (b) the balance a base fluid of hexafluoropropylene epoxide. In addition certain specific grease formulations which are the preferred embodiments, coming within the above general statement of the invention are also contemplated by this invention.

In the art of lubrication and, particularly, of lubricants having sufficient dimensional stability to give them grease-like qualities or to classify them as greases, advancing technology is constantly demanding performance over wider temperature ranges and under a variety of hitherto unencountered environmental conditions and extremes. In aerospace engineering, for example, extremely high temperatures such as those encountered upon atmospheric re-entry must be accommodated. Lubricity must be maintained by a grease-like substance which will keep its dimensional stability, and hence its association with the parts to be lubricated at high temperatures and high speeds. In the almost complete vacuum of outer space, lubricants are required which can maintain their grease-like consistency and lubricating capacity under extremely low pressure and at very low temperatures. In aerospace launch vehicles, particularly those employing liquid oxygen as part of the combustion system, explosion resistance on impact in the presence of the liquid oxygen is an important property of the greases employed.

While significant breakthroughs are being regularly made with regard to lubricating fluids to meet these increasingly demanding situations, the improvements in the fluids themselves have not been capable of being carried over into greases incorporating them. Consequently, while advancement in lubrication is generally moving forward, the art of grease formulation is not keeping pace.

Cases in point are the recently discovered epoxides of hexafluoropropylene which have been polymerized in a liquid state and have shown considerable promise as lubricating fluids. Attempts to utilize these liquids as a base for grease compositions have, however, proved unsatisfactory to date. For example, when such conventional grease thickeners as carbon black, graphite, mica, talc, bentone, clay and silica type thickeners and even such newly employed organic substances as arylurea compounds have been added to the hexafluoropropylene epoxide liquids, the mixture has remained a liquid, though its viscosity might have changed, and no grease-like properties have resulted.

It is accordingly an object of this invention to provide an improved grease formulation for operation over a wide temperature range and under exposure to a variety of abnormal or extreme environmental situations.

Still another object of the present invention is to provide such a grease formulation that will perform for prolonged periods of exposure to hyperthermal environments.

Yet another object of the invention is to provide a grease composition which will remain grease-like and continue to perform its lubricating functions in substantial vacuums on the order of that encountered in outer space.

DESCRIPTION OF THE PREFERRED EMBODIMENTS

The above objects and advantages, which will be apparent from a reading of the following disclosure, are achieved according to this invention by the employment of that class of materials which consists of ammeline, fluorocarbon resins and boron nitride as grease-thickening additives for the epoxide of hexafluoropropylene. The triazine may be the technical grade powder form manufactured and sold under the trade name, "Ammeline," by the American Cyanamide Company, the fluorocarbon resin may be any of the tetrafluoroethylene (TEF) or fluorinated ethylene-propylene (FEP) polymers or resins manufactured and sold by the E. I. du Pont de Nemours Company of Wilmington, Del., under its trade name, Teflon; and the boron nitride is in spherical particles of a size ranging from 0.1 to 0.5 micron in diameter. "Ammeline" is well known in the art to be 2,4-diamino-6-hydroxy-1,3,5-triazine. It has been found that optimum results are achieved where the ammeline powders are employed in weight ratios of from nineteen to twenty-four parts to from eighty-one to seventy-six parts of the hexafluoropropylene epoxide liquid; whereas the fluorocarbon resin may be employed in greater percentages of twenty up to thirty-five weight percent of the total grease composition. The spherical boron nitride particles on the other hand are employed in a smaller percentage ranging from seven to ten weight percent of the total grease formulation.

The epoxide of hexafluoropropylene,

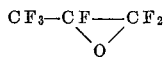

is described in U.S. Pat. No. 3,250,808 and representative thereof for use in the present invention are P.R. 143 fluids manufactured and sold by E. I. du Pont de Nemours and Company of Wilmington, Del.

In one embodiment of this invention a grease formulation was made by utilizing 78.7 parts by weight of Du Pont's P.R. 143 Hexafluoropropylene epoxide liquid and 21.3 parts by weight of ammeline. After these ingredients were thoroughly mixed, first by spatula blending and then by milling several passes through a 3-roll mill, the mixture was subjected to conventional testing with the following results. On the ASTM D217–60T unworked penetration cone drop test, a value of 260 was achieved; and, after working the cone sixty strokes in the test device, a worked penetration reading of 275 was achieved. In a standard Pope Spindle bearing test wherein the bearings were loaded with five pounds and operated at 10,000 revolutions per minute, the grease performed and allowed the test to continue demonstrating satisfactory lubricity for 1760 hours at temperatures of 500° Fahrenheit, for 240 hours at 550° Fahrenheit and for 160 hours at 600° Fahrenheit.

In another example wherein seventy-six parts by weight of the hexafluoropropylene epoxide liquid and twenty-four percent by weight of the ammeline thickener were combined in a grease formulation, the same unworked penetration test gave a value of 319 while the worked penetration value was 348. In the same five-pound loaded bearing test at 10,000 revolutions per minute, the grease performed as a lubricant for more than 1,000 hours at 500° Fahrenheit, for 300 hours at 550° Fahrenheit and for 128 hours at 600° Fahrenheit. When this same formulation was applied to the same bearing test under a three pound load at 10,000 revolutions per minute, but in a vacuum of 10⁻⁷ millimeters of mercury at 400° Fahrenheit, the apparatus functioned properly for more than 1400 hours and when the load was increased to five pounds under the same revolutions and vacuum conditions, the grease functioned properly for 595 hours indicating its satisfactory performance under the vacuum condition existing in outer space.

In still another example where the hexafluoropropylene epoxide liquid comprised eighty-one percent of the formulation and the ammeline thickener only nineteen parts by weight, the unworked penetration value was 383 while the worked penetration was 391. While this grease allowed operation for only 120 hours at 600° Fahrenheit in the bearing test under five pounds loading at 10,000 revolutions per minute, the test life was actually increased to 186 hours at 600° Fahrenheit where the load was increased from five to from twenty-five to fifty pounds at the same 10,000 revolutions per minute. At 600° Fahrenheit at five-pound loading and 20,000 revolutions per minute, the test apparatus was able to run for sixty hours; and when the same temperature and loading were maintained while the revolutions per minute were increased to 30,000 adequate lubricity was provided for twenty-one hours.

In a grease formulation comprising seventy weight percent of the hexafluoropropylene epoxide and thirty percent of a dry preferred fluorocarbon resin manufactured and sold under the trade designation Teflon 120 FEP (fluorinated ethylenepropylene) by the du Pont de Nemours Company of Wilmington, Del., the bearing test under five pounds load at 10,000 revolutions per minute ran for only 300 hours at 500° Fahrenheit and only 220 hours at 500° Fahrenheit; but the unworked penetration as measured on the ASTM penetrometer gave a value of 290, and a worked penetration after sixty strokes in the penetrometer yielded a reading of 315 indicating that grease-like consistency and grease-like performance were obtained, contrary to the results that are achieved where conventional thickeners are applied to the same neat fluid.

Where ninety parts by weight of the hexafluoropropylene epoxide liquid and ten percent by weight of the boron nitride in spherical particulate form was employed, again the ASTM D217–60T penetrometer test showed an unworked penetration value at 329 and a worked penetration value of 366 indicating that, although it was not as thick, a grease-type formulation was obtained.

In a related formulation based upon the spherical boron nitride particles where they represent seven percent by weight of the total grease and the hexafluoropropylene epoxide liquid represents ninety-three weight percent of the total formulation, a grease-like consistency is achieved capable of performing substantially as does the mixture composed of the fluid and thickener in the ratio of nine to one. Tests conducted on the formulation containing only seven percent of spherical boron nitride particles, however, according to U.S. Air Force Specification Bulletin No. 527, produced a reading of more than eighty foot-pounds indicating that this formulation possesses excellent explosion resistance upon impact in the presence of liquid oxygen. In view of this particular property, these grease formulations, of course, offer considerable promise for use in aerospace launch vehicles for example wherein liquid oxygen is employed in the combustion system. Beyond this, the availability of boron nitride thickened hexafluoropropylene epoxide greases for use at temperatures on the order of from 400° to 500° Fahrenheit is demonstrated by the fact that, on the Pope Spindle Bearing Test, when the bearings were lubricated by this formulation, loaded at five pounds and operated at 10,000 revolutions per minute, grease-like consistency and lubricity were maintained for over 1900 hours at 400° Fahrenheit and for over 200 hours at 500° Fahrenheit.

The superiority of spherical particles of boron nitride over platelet particles is illustrated by the following table:

|  | Grease 1 [1] | Grease 2 [2] |
|---|---|---|
| Unworked penetration | 261.5 | 303.4 |
| Worked penetration | 279.7 | 339.0 |
| Pope spindle test, 10,000 r.p.m., 400° F. (hrs.) | 81.3 | 2,432.0 |
| Pop spindle test, 10,000 r.p.m., 450° F. (hrs.) | | 1,265.0 |
| Pope spindle test, 10,000 r.p.m., 500° F. (hrs.) | | 320.0 |

[1] 83.0% hexafluoropropylene epoxide, 17.0% boron nitride, commercial grade, platelet form.
[2] 93.0% hexafluoropropylene epoxide, 7.0% boron nitride, spherical form.

From the above table it will be apparent that the use of less than half as much boron nitride but in the spherical form, is much more effective than the boron nitride in platelet form.

The following table illustrates that the hexafluoropropylene epoxide as a base fluid is more effective than a well known silicone oil, particularly at high temperatures:

|  | Grease 1 [1] | Grease 2 [2] |
|---|---|---|
| Unworked penetration | 260 | 272 |
| Worked penetration | 275 | 275 |
| Pope spindle performance, 10,000 r.p.m., 600° F. (hrs.) | 160 | 74 |

[1] 78.7% hexafluoroprepylene epoxide, 21.3% ammeline.
[2] 65.0% Dow Corning QF 6–7039 silicone, 35.0% ammeline.

While the within invention has been described in considerable detail in connection with certain specific examples and embodiments thereof, it is to be understood that the foregoing particularization and detail have been for the purposes of illustration only and do not limit the scope of the invention as defined in the subjoined claims.

What I claim is:

1. A grease formulation comprising (a) a thickener selected from the group consisting of 19 to 24% by weight of a 2,4-diamino-6-hydroxy-1,3,5-triazine, 7 to 10% by weight of spherical boron nitride particles ranging from .1 to .5 micron in diameter and 20 to 35% in weight of fluorinated ethylene-propylene polymer, and (b) the balance a base fluid of hexafluoropropylene epoxide.

2. The formulation of claim 1 wherein the boron nitride is 10% by weight and the hexafluoropropylene epoxide is 90% by weight.

3. The formulation of claim 1 wherein the boron nitride is 7% by weight and the hexafluoropropylene epoxide is 93% by weight.

4. The formulation of claim 1 wherein the 2,4-diamino-6-hydroxy-1,3,5-triazine is 24% by weight and the hexafluoropropylene epoxide is 76% by weight.

5. The formulation of claim 1 wherein the fluorinated ethylene-propylene polymer is 30% and the hexafluoropropylene epoxide is 70%.

References Cited

UNITED STATES PATENTS

| | | | |
|---|---|---|---|
| 3,112,297 | 11/1963 | Gordon et al. | 252—58 |
| 3,189,542 | 6/1965 | Morway et al. | 252—51.5 |
| 3,196,109 | 7/1965 | Morway et al. | 252—25 |
| 3,248,326 | 4/1966 | Swenson | 252—58 |
| 3,250,808 | 5/1966 | Moore et al. | 252—54 |

DANIEL E. WYMAN, Primary Examiner

I. VAUGHN, Assistant Examiner

U.S. Cl. X.R.

252—54, 58, 51.5